(12) United States Patent
Grant et al.

(10) Patent No.: US 7,938,009 B2
(45) Date of Patent: May 10, 2011

(54) HAPTIC DEVICE TESTING

(75) Inventors: Danny A. Grant, Montreal (CA); Juan Manuel Cruz-Hernandez, Montreal (CA); Pedro Gregorio, Verdun (CA)

(73) Assignee: Immersion Corporation, San Jose, CA (US)

( * ) Notice: Subject to any disclaimer, the term of this patent is extended or adjusted under 35 U.S.C. 154(b) by 1225 days.

(21) Appl. No.: 11/555,412

(22) Filed: Nov. 1, 2006

(65) Prior Publication Data

US 2007/0182711 A1  Aug. 9, 2007

Related U.S. Application Data

(60) Provisional application No. 60/764,588, filed on Feb. 1, 2006.

(51) Int. Cl.
*G01H 11/00* (2006.01)
*B06B 1/00* (2006.01)

(52) U.S. Cl. ............................................. 73/649; 73/663

(58) Field of Classification Search ............ 73/662–663, 73/649

See application file for complete search history.

(56) References Cited

U.S. PATENT DOCUMENTS 7,683,565 B2 *  3/2010  Quaid et al. ............. 318/568.16

FOREIGN PATENT DOCUMENTS

DE  102004049938 A  *  4/2006
GB  2274714 A  *  8/1994

OTHER PUBLICATIONS

Translation for DE102004049938 pp. 1-4.*
Translation of DE102004049938 of Sep. 2010.*

* cited by examiner

*Primary Examiner* — Hezron Williams
*Assistant Examiner* — Nashmiya Fayyaz
(74) *Attorney, Agent, or Firm* — Womble Carlye Sandridge & Rice, PLLC

(57) ABSTRACT

A method of testing a haptic device that includes an actuator and has a first weight includes placing the haptic device on a test fixture that has a second weight that is greater than the first weight. The haptic device is placed on the test fixture so that the actuator within the haptic device is substantially close to the center of gravity of the test fixture. The method further includes causing the haptic device to generate haptic effects via the actuator, and measuring the acceleration of the test fixture during the haptic effects.

23 Claims, 3 Drawing Sheets

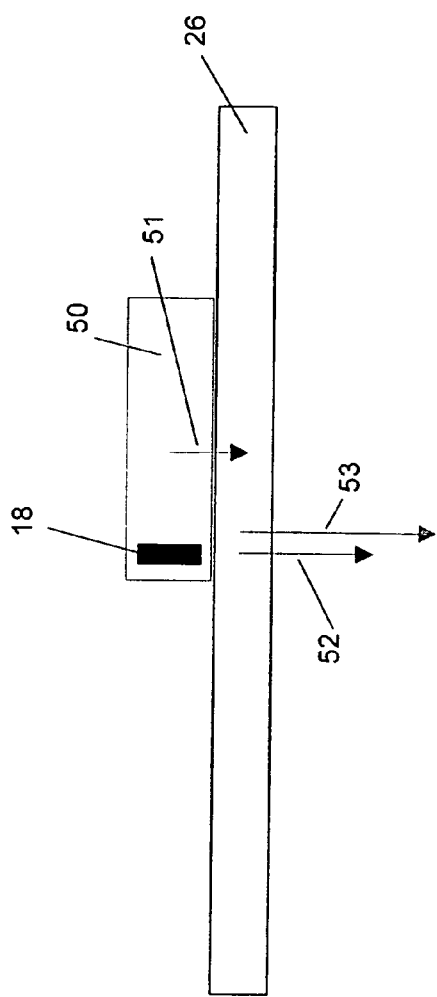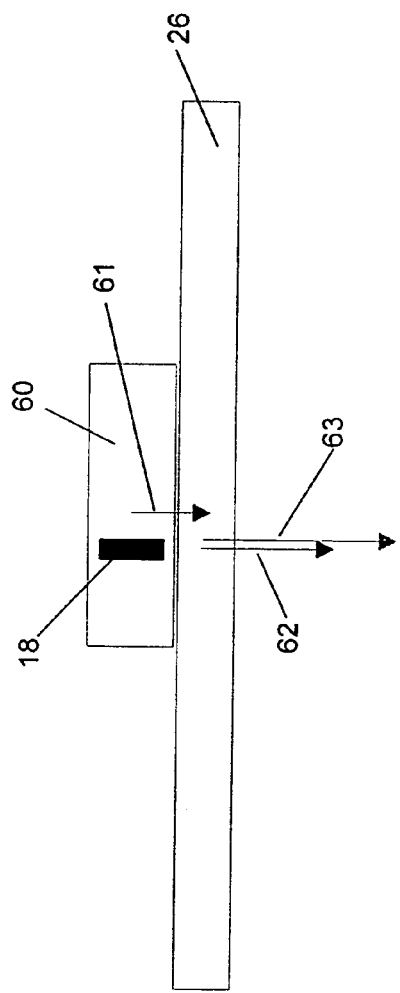

HAPTIC DEVICE TESTING

RELATED APPLICATIONS

This application claims the benefit of U.S. Provisional Patent Application No. 60/764,588 filed Feb. 1, 2006, the specification of which is herein incorporated by reference.

FIELD OF THE INVENTION

One embodiment of the present invention is directed to devices that include haptic effects. More particularly, one embodiment of the present invention is directed to certification testing of haptic devices.

BACKGROUND INFORMATION

A haptic effect for mobile wireless communication devices or handsets, or non-communication devices such as portable gaming machines and gaming console controllers, is typically the generation of different types of vibrations at the handset to provide vibrotactile feedback to the user. Haptic devices that may include haptic effects, such as cellular telephones and personal digital assistants ("PDAs"), come in different shapes and sizes, utilize different actuators to generate vibrations, and locate the actuators in different places on the devices, and therefore by nature are mechanically different. As a result, when designing a device with a haptic effect, the vibrations as sensed by a user may vary greatly depending on these differences.

However, haptic devices are intended to transmit certain information to the user. When different devices are used to transmit the same information, it is imperative that these devices behave in a similar fashion and have the same performance criteria. Haptic devices of the same model/type produced in series through a certain manufacturing process might achieve the same performance criteria if a good quality assurance process is followed from the time the device is designed throughout the complete manufacturing process. However, when haptic devices of different sizes and masses are designed and implemented to give the same haptic information, it becomes more difficult to assure that they meet a consistent performance criteria.

Based on the foregoing, there is a need for a method and apparatus for certification and testing during the manufacture of haptic devices to ensure that different types of devices perform properly and consistently even if they are mechanically different.

SUMMARY OF THE INVENTION

One embodiment of the present invention is a method of testing a haptic device that includes an actuator and has a first weight. The method includes placing the haptic device on a test fixture that has a second weight that is greater than the first weight. The haptic device is placed on the test fixture so that the actuator within the haptic device is substantially close to the center of gravity of the test fixture. The method further includes causing the haptic device to generate haptic effects via the actuator, and measuring the acceleration of the test fixture during the haptic effects.

BRIEF DESCRIPTION OF THE DRAWINGS

FIGS. 3a and 3b are block diagrams of side views of haptic devices placed on a plate in accordance with one embodiment of the present invention.

DETAILED DESCRIPTION

One embodiment of the present invention is a method of vibration testing haptic devices that compensates for the variation of the placement of the actuator within different haptic devices.

Figure 1:
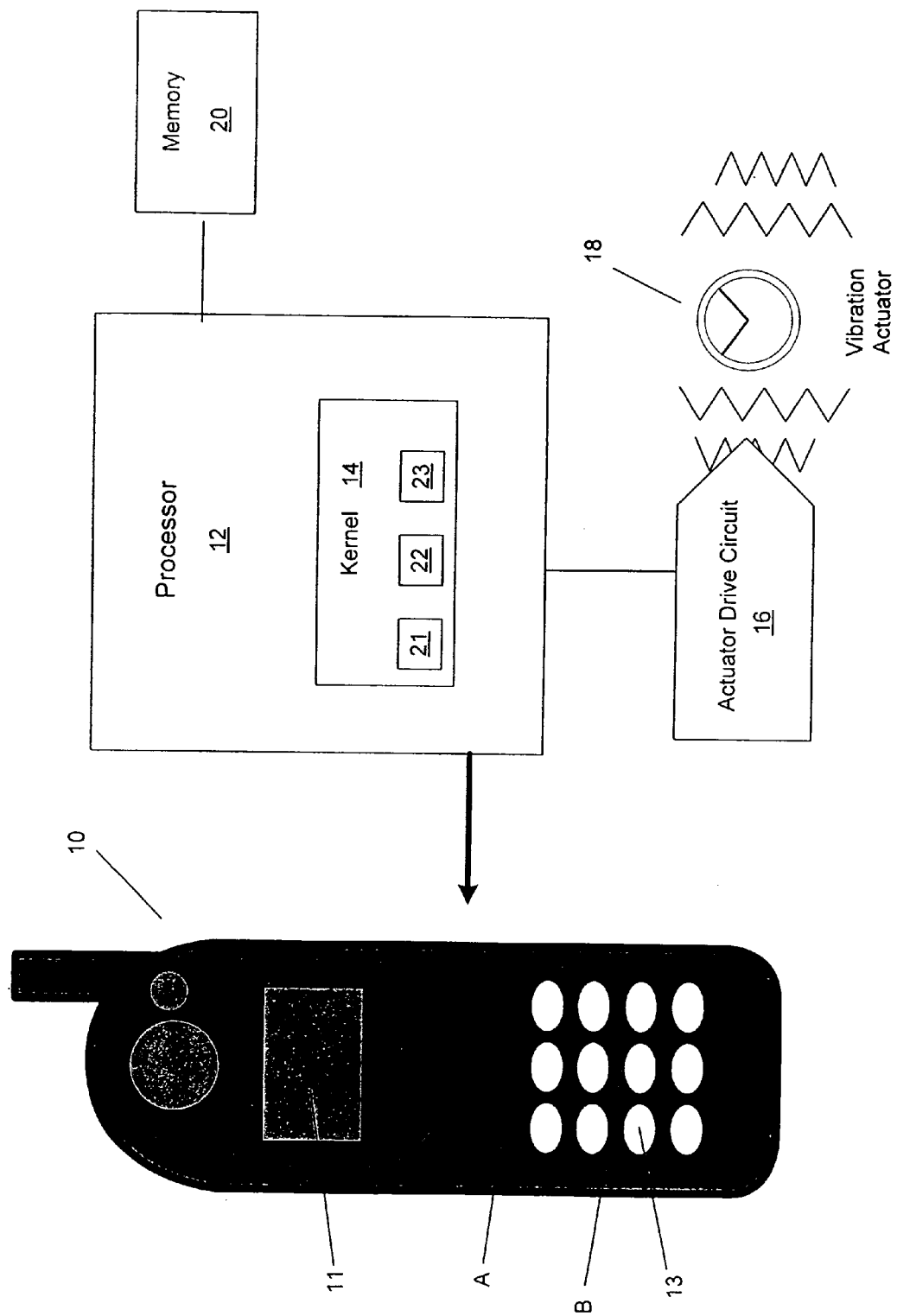
FIG. 1 is a block diagram of a haptic device that may be tested or certified in accordance with one embodiment of the present invention.

FIG. 1 is a block diagram of a haptic device 10 that may be tested or certified in accordance with one embodiment of the present invention. Haptic device 10 is a cellular telephone. However, embodiments of the present invention can be implemented with any type of handset or mobile device that generates haptic effects via an actuator.

Device 10 includes a screen 11 and keys 13. In one embodiment, keys 13 are mechanical type keys. In another embodiment, keys 13 can be implemented by a touch screen so that keys 13 are touch screen keys, or can be implemented using any method. Internal to handset 10 is a haptic effects system that generates vibrations on telephone 10. In one embodiment, the vibrations are generated on the entire telephone 10. In other embodiments, specific portions of device 10 can be haptically enabled by the haptic effects system, including individual keys of keys 13, whether the keys are mechanically oriented, touch screen, or some other type of implementation.

The haptic effects system includes a processor 12, which includes a kernel 14. Coupled to processor 12 is a memory device 20 and an actuator drive circuit 16, which is coupled to a vibration actuator 18. Kernel 14 includes one or more controllers 21-23 which are each responsible for generating specific haptic effects.

Processor 12 may be any type of general purpose processor, or could be a processor specifically designed to provide haptic effects, such as an application-specific integrated circuit ("ASIC"). Processor 12 may be the same processor that operates the entire handset 10, or may be a separate processor. In one embodiment, kernel 14 is a software process executed by processor 12. Processor 12 decides what haptic effects are to be played and the order in which the effects are played. Controllers 21-23 convert high level controller parameters from kernel 14 to motor command/control signals. In general, the high level parameters that define a particular haptic effect include magnitude, frequency and duration.

Processor 12 outputs the control signals to drive circuit 16 which includes electronic components and circuitry used to supply actuator 18 with the required electric current to cause the desired haptic effects. For example, the current provided by drive circuit 16 to actuator 18 can have varying magnitudes of positive and negative current. Further, the current may be in the form of periodic signals with varying periods and/or phases.

Vibration actuator 18 generates a vibration on device 10. Actuator 18 can include one or more force applying mechanisms which are capable of applying a vibrotactile force to a user of device 10 (e.g., via the housing of device 10). This force can be transmitted, for example, in the form of vibrational movement caused by a rotating mass, a piezo-electric device, or other vibrating actuator type. Actuator 18 may be an Eccentric Rotating Mass ("ERM") in which an eccentric mass is moved by a motor, or a Linear Resonant Actuator ("LRA") in which a mass attached to a spring is driven back and forth.

Memory device 20 can be any type of storage device, such as random access memory ("RAM") or read-only memory ("ROM"). Memory device 20 stores instructions executed by processor 12. Memory device 20 may also be located internal to processor 12, or any combination of internal and external memory.

Controllers 21-23 in one embodiment are stored instructions and controller parameters that define haptic effects that are eventually converted to vibrational movement by vibration actuator 18. In one embodiment, the controllers 21-23 store parameters that define smooth, strong and sharp haptic effects, respectively. In one embodiment, the sharp haptic effect includes active braking (i.e., the ability to reverse the actuator motor) through the use of bidirectional pulses which allows for relatively narrow pulses. The smooth and strong haptic effects do not include active braking and only utilize unidirectional pulses.

The location of vibration actuator 18 within device 10 can vary significantly among different types and models of haptic devices. For example, actuator 18 may be located at position A of device 10, which may coincide approximately with the center of gravity of device 10. In another embodiment, actuator 18 may be located at position B of device 10, closer to keys 13, in order to generate a stronger haptic effect in the area of keys 13. In other embodiments, the location of actuator 18 may be determined by a limitation of available space within device 10, or other factors.

In one embodiment, in order to determine whether a manufactured haptic device meets predetermined performance standards, certification testing is done on the completed device. One type of test evaluates actuator 18 within device 10 by measuring the output acceleration/vibration created by actuator 18.

Figure 2:
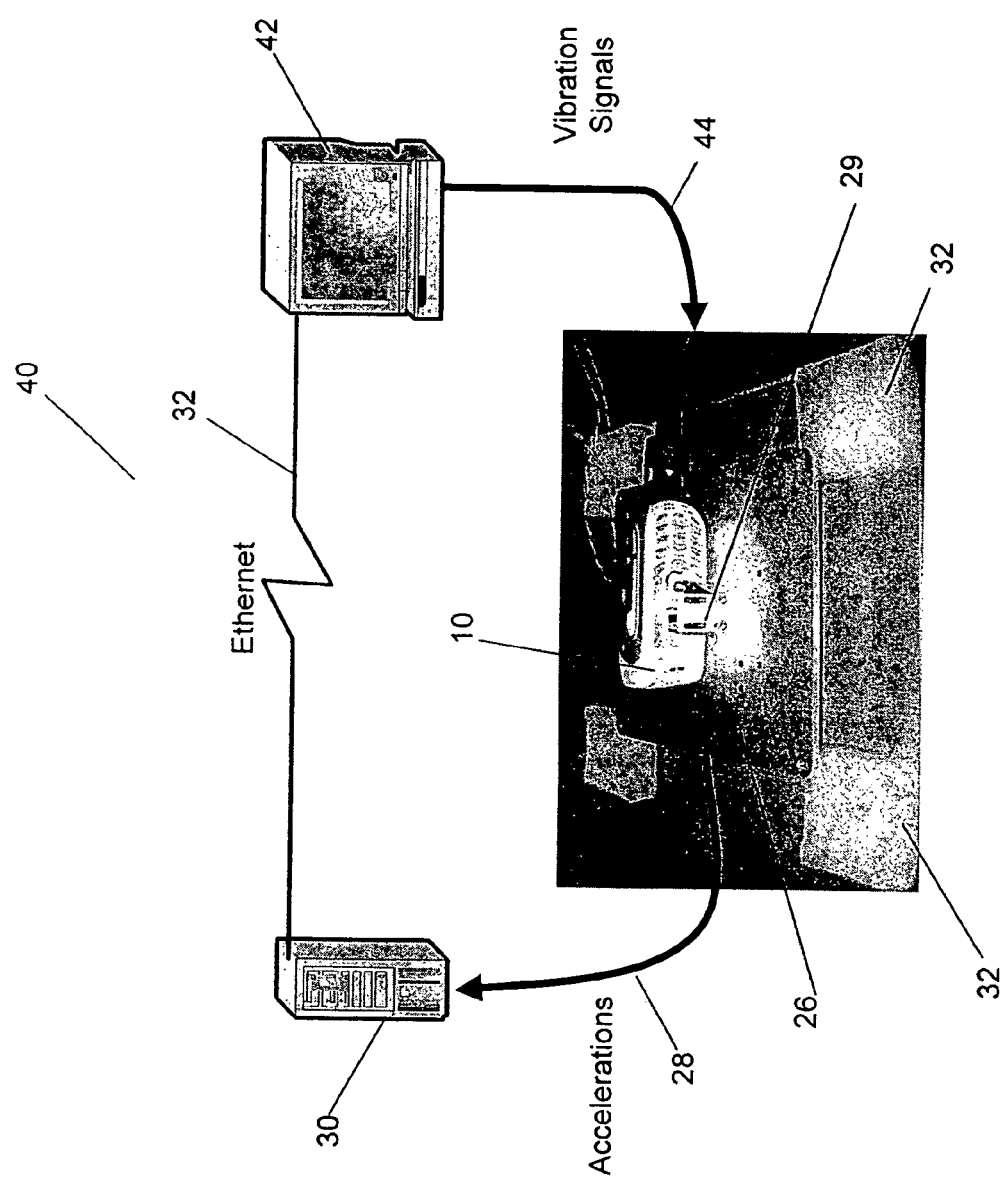
FIG. 2 is a block diagram of a test system for testing a haptic device in accordance with one embodiment of the present invention.

In one embodiment, the acceleration is measured while device 10 is placed in a test system. FIG. 2 is a block diagram of a test system 40 for testing haptic device 10 in accordance with one embodiment of the present invention. Device 10 is placed on a metal plate 26 and secured by a clamp 29. Plate 26 is supported by four rubber blocks 32. Blocks 32 in other embodiments are formed of any known compliant or viscoelastic material.

System 40 further includes a computer 42 that includes a processor and memory and is programmed to generate a series of test parameters. The test parameters are coupled via a cable 44 to device 10 through a universal serial bus ("USB") port or other type of computer interface on device 10. The test parameters, when received by device 10, causes device 10 to generate a series of haptic vibrations via actuator 18 within device 10. An accelerometer (not shown) is coupled to the back of plate 26. The accelerometer measures the vibrations generated by device 10, and transmits the measurements to a server 30 via a cable 28. Server 30 includes a processor and memory and operates a real-time operating system ("RTOS") that captures the acceleration measurements and sends them to host computer 42 via an Ethernet link 32 or other type of communication method for further test processing. In other embodiments, the functionality of computer 42 and server 30 is performed by a single computer having a processor and memory.

As shown in FIG. 2, device 10 is placed approximately in the center of plate 26. However, one issue with objectively comparing performances between different devices is the location and orientation of the actuator within the devices. If the actuator is not at the center of gravity of the device, which is typical, a rocking motion will be introduced and captured by the acceleration measurement. For different locations of the actuator, the rocking will be different, and therefore the measured acceleration will also be different, making it difficult to objectively compare performance results between devices.

One embodiment of the present invention overcomes this problem and provides an objective method of comparing the performance of different devices with different actuator locations. The method includes using a relatively test fixture 26 having a well distributed mass. In one embodiment, test fixture 26 is a plate. In one embodiment, test fixture 26 has a weight approximately twice as much as the weight of device 10. In another embodiment, test fixture 26 has a weight of approximately 400 grams while device 10 has a weight of approximately 100 grams. In one embodiment, test fixture 26 has a large linear dimension relative to device 10.

The method further includes placing the actuator as close as possible to the location of the center of gravity of test fixture 26. As a result, the rocking motion generated by the center of gravity of device 10 being in a different location of the vibration source (i.e., actuator) is minimized because the location of the overall system center of gravity is now closer to the vibration source. Further, the large linear dimension of test fixture 26 relative to device 10 allows the offset of the actuator from the center of gravity of device 10 to be reduced to second order terms when vibrating the entire test jig plus device 10. Thus, two haptic devices can be compared in an objective fashion independent of the location and orientation of their vibration sources.

FIGS. 3a and 3b are block diagrams of side views of haptic devices placed on plate 26 in accordance with one embodiment of the present invention. In FIG. 3a, a haptic device 50 has a location of its center of gravity as indicated by arrow 51, and an actuator 18. Plate 26 has a center of gravity 52. Device 50 is placed on plate 26 so that actuator 18 is substantially close to center of gravity 52. The combined center of gravity of device 50 and plate 26 then results in center of gravity 53.

Similarly, in FIG. 3b, a haptic device 60 has a center of gravity as indicated by arrow 61, and an actuator 18 that is located a different position than in device 50. Plate 26 has a center of gravity 62. Device 60 is placed on plate 26 so that actuator 18 is substantially close to center of gravity 62. The combined center of gravity of device 50 and plate 26 then results in center of gravity 63, which is substantially similar to center of gravity 53, despite the different placements of actuator 18 in devices 50 and 60. In both FIGS. 3a and 3b, the vibration source (i.e., actuator 18) is closely aligned with the center of gravity of the combined plate and device.

In one embodiment, during the manufacturing process of haptic devices, vibrations measurements are made on the actuator before it is placed in the haptic device. Then, after the actuator is placed in the device, the device is placed on the plate so that the actuator is close to the center of gravity of the plate as disclosed above. In one embodiment, the following measurements are performed by test system 40:

Strength of the vibrations—For the vibrations to be useful they should be of a certain strength (measured in Gravities) and within a certain frequency range. Measurements are scaled to match the weight of the device.

Frequency match—The frequency range measured with the actuator alone should match the frequency range measured with the device.

Rise time—Similar to an actuator authority measurement on the stand-alone actuator, which is measured as the time that it takes the actuator to reach its maximum final value when an input voltage is applied at rated value (maximum input) and compared against an upper limit (the faster the better). The "rise time" is for all input values, not just the rated voltage. This value should be smaller than a certain upper limit value.

Stop time—Related to the friction in the actuator, which is measured as the time that the actuator takes to stop vibrating after the step input at rated voltage has been removed. The stop time for all input values (not just the rated voltage) should be smaller than a given upper limit value, especially in Sharp mode. This is the result of using brake pulses to improve the stop time.

Output resolution—The vibrations should have at least some predetermined number of levels in order to ensure a good magsweep effect (ramp up-ramp down).

Output linearity—For a ramp up or magsweep of increasing value (varying input), a line fitted to the measured output vibrations should be within some percentage of the measured data. This will ensure that the level variation does not happen only at a certain range but instead is distributed over the whole input range.

Reference file—A reference file with different effects can be used to measure frequency of vibrations and timing between effects.

In one embodiment, Table 1 below discloses the limits imposed on the above features while testing a device in system 40:

| Feature name | Units | Value (range) | Comments |
| --- | --- | --- | --- |
| Peak to Peak Acceleration | Acceleration (G) | $A_{PP} > 1.2$<br>$100 <= F_{target} <= 220$ | Device test bed values should be scaled to match actuator values |
| Frequency Match | Frequency Range (Hz) | Handset range must match motor range (+−10%) | |
| Rise time (Sharp and/or strong mode) | Time (msec) | $\tau_{rise} < 75$ | For the whole input range, this is upper limit for all input values |
| Stop time (Sharp mode) | Time (msec) | $T_{stop} < 50$ | For the whole input range (upper limit for all input values) |
| Output resolution | Levels | $L > 32$ | For the whole input range measured in distinct acceleration values |
| Output linearity | % | +−10% | A line fitted to the data. |
| Reference file | % time | +−10% | Duration and timing for 2 pulses: 0.5 on, 0.5 off 0.25 On; 5 Hz signal 2 sec. Others can be added. |

As disclosed, embodiments of the present invention allow haptic devices to be vibrationally tested and objectively compared to other devices regardless of the placement of the actuator within the haptic devices. This assures that haptic effects among dissimilar haptic devices will feel consistent to a user.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, some embodiments disclosed above are implemented as testing a cellular telephone, which is an object that can be grasped, gripped or otherwise physically contacted and manipulated by a user. As such, the present invention can be employed on other haptics enabled input and/or output devices that can be similarly manipulated by the user. Such other devices can include a touch screen (e.g., a Global Positioning System ("GPS") navigator screen on an automobile, an automated teller machine ("ATM") display screen), a remote for controlling electronics equipment (e.g., audio/video, garage door, home security, etc.) and a gaming controller (e.g., joystick, mouse, specialized controller, etc.). The operation of such input and/or output devices is well known to those skilled in the art.

What is claimed is:

1. A method of testing a haptic device of a first weight and comprising an actuator, said method comprising:
   receiving the haptic device on a mass having a second weight that is greater than the first weight and having a first center of gravity, wherein said haptic device is received on the mass so that the actuator is substantially close to the first center of gravity,
   wherein said haptic device has a second center of gravity, and said actuator is located within said haptic device at a position different from the second center of gravity;
   causing said haptic device to generate haptic effects via the actuator; and
   measuring an acceleration of said mass during the haptic effects.

2. The method of claim 1, where the haptic effects are vibrotactile.

3. The method of claim 1, wherein the second weight is approximately twice the first weight.

4. The method of claim 1, wherein the mass is a plate.

5. A method of testing a haptic device of a first weight and comprising an actuator, said method comprising:
   receiving the haptic device on a mass having a second weight that is greater than the first weight and having a first center of gravity, wherein said haptic device is received on the mass so that the actuator is substantially close to the first center of gravity;
   causing said haptic device to generate haptic effects via the actuator;

measuring an acceleration of said mass during the haptic effects; and vibration testing the actuator before the actuator is placed in said haptic device.

6. The method of claim 1, further comprising calculating a strength of vibrations based on the acceleration of said mass, wherein the calculating comprises a scaling to compensate for the first weight.

7. The method of claim 4, wherein the plate has a substantially larger linear dimension than said haptic device.

8. The method of claim 1, further comprising calculating a rise time and a stop time based on the acceleration of said mass.

9. A system for testing a haptic device having a first weight and comprising an actuator, said system comprising:
   a test fixture having a second weight and having a second center of gravity;
   an accelerometer coupled to said test fixture; and
   a processor adapted to be coupled to said haptic device to cause said haptic device to generate haptic effects and to receive acceleration measurements from said accelerometer, wherein said haptic device has a first center of gravity, and said actuator is located within said haptic device at a position different from the first center of gravity;
   wherein said second weight is greater than said first weight, and the system tests said haptic device when said haptic device is placed on the test fixture so that the actuator is substantially close to said second center of gravity.

10. The system of claim 9, wherein said second weight is approximately twice said first weight.

11. The system of claim 9, wherein said test fixture is a plate.

12. The system of claim 9, wherein said test fixture has a high mass relative to said haptic device.

13. The system of claim 9, wherein said haptic effects are vibrotactile.

14. A method of testing a haptic device comprising:
   receiving the haptic device on a test fixture so that an actuator within the haptic device substantially coincides with a first center of gravity of the test fixture;
   activating the actuator to generate a haptic effect; and
   measuring an acceleration of said test fixture.

15. The method of claim 14, wherein the haptic device has a first weight and said test fixture has a second weight that is greater than said first weight.

16. The method of claim 15, wherein said second weight is approximately twice said first weight.

17. The method of claim 14, wherein said test fixture is a plate.

18. The method of claim 14, wherein the haptic device has a second center of gravity, and said actuator is located within said haptic device at a position different from the second center of gravity.

19. The method of claim 14, further comprising vibration testing the actuator before the actuator is placed in the haptic device.

20. The method of claim 15, further comprising calculating a strength of vibrations based on the acceleration of said test fixture, wherein the calculating comprises a scaling to compensate for the first weight.

21. The method of claim 19, wherein the vibration testing generates a first frequency range, further comprising calculating a second frequency range of the haptic device based on the acceleration of said test fixture and determining whether the first frequency range approximately matches the second frequency range.

22. The method of claim 14, further comprising calculating a rise time and a stop time based on the acceleration of said test fixture.

23. The method of claim 17, wherein said plate has a substantially larger linear dimension than said haptic device.

* * * * *